(12) United States Patent
Matsuhisa et al.

(10) Patent No.: US 10,673,360 B2
(45) Date of Patent: Jun. 2, 2020

(54) MOTOR CONTROLLER

(71) Applicant: JTEKT CORPORATION, Osaka-shi, Osaka (JP)

(72) Inventors: Koichiro Matsuhisa, Toyota (JP); Hiroshi Sumasu, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/273,464

(22) Filed: Feb. 12, 2019

(65) Prior Publication Data

US 2019/0260317 A1  Aug. 22, 2019

(30) Foreign Application Priority Data

Feb. 19, 2018 (JP) .................. 2018-027164

(51) Int. Cl.
| | |
|---|---|
| *B60H 1/32* | (2006.01) |
| *H02P 7/29* | (2016.01) |
| *H02K 11/33* | (2016.01) |
| *B62D 5/04* | (2006.01) |
| *G05B 11/28* | (2006.01) |

(Continued)

(52) U.S. Cl.
CPC .......... *H02P 7/2913* (2013.01); *B62D 5/0406* (2013.01); *B62D 5/0457* (2013.01); *G05B 11/28* (2013.01); *H02K 11/33* (2016.01); *H02M 1/00* (2013.01); *H02M 7/5395* (2013.01); *H02M 7/53875* (2013.01); *H02P 6/08* (2013.01); *H02P 6/085* (2013.01); *H02P 27/08* (2013.01); *H02K 7/14* (2013.01); *H02M 2001/123* (2013.01)

(58) Field of Classification Search
CPC .......... H02P 7/2913; H02P 6/08; H02P 6/085; H02P 27/08; H02K 11/33; H02K 7/14; B62D 5/0406; B62D 5/0457; G05B 11/28; H02M 1/00; H02M 7/53875; H02M 7/5395; H02M 2001/123
USPC .................................. 318/268, 432
See application file for complete search history.

(56) References Cited

U.S. PATENT DOCUMENTS

| | | | |
|---|---|---|---|
| 2013/0221895 A1 | 8/2013 | Kanda et al. | |
| 2017/0274735 A1* | 9/2017 | Kawasaki | ............ H02K 7/14 |

FOREIGN PATENT DOCUMENTS

| | | |
|---|---|---|
| EP | 0829948 A2 | 3/1998 |
| JP | S64-50766 A | 2/1989 |
| JP | 2016-100952 A | 5/2016 |

OTHER PUBLICATIONS

Oct. 22, 2019 extended European Search Report issued in European Patent Application No. 19167730.3.

* cited by examiner

*Primary Examiner* — Bickey Dhakal
*Assistant Examiner* — Zemenay T Truneh
(74) *Attorney, Agent, or Firm* — Oliff PLC (57) ABSTRACT

A motor controller includes a motor drive circuit, a noise cancellation circuit, and a control unit. The motor drive circuit supplies electric power to an electric motor. The noise cancellation circuit includes an RLC circuit, a switch element, and a pull-down resistor. One end of the RLC circuit is electrically connected to a positive terminal of a power supply via the switch element, and the other end of the RLC circuit is electrically connected to a frame ground. A connection point between the RLC circuit and the switch element is electrically connected to a negative terminal of the power supply via the pull-down resistor. The control unit turns ON the switch element for a predetermined time at falling timings of phase voltages output from the motor drive circuit.

3 Claims, 6 Drawing Sheets

(51) Int. Cl.
  *H02P 6/08*     (2016.01)
  *H02M 1/00*     (2006.01)
  *H02M 7/5387*   (2007.01)
  *H02M 7/5395*   (2006.01)
  *H02P 27/08*    (2006.01)
  H02M 7/44      (2006.01)
  H02M 1/12      (2006.01)
  H02K 7/14      (2006.01)

(a) U-PHASE VOLTAGE Vu (b) V-PHASE VOLTAGE Vv (c) W-PHASE VOLTAGE Vw (d) COMMON MODE CURRENT

(e) NOISE CANCELLATION CURRENT (f) GATE VOLTAGE OF FIRST NOISE CANCELLATION CIRCUIT (g) SOURCE VOLTAGE OF FIRST SWITCH ELEMENT (h) GATE VOLTAGE OF SECOND NOISE CANCELLATION CIRCUIT (i) DRAIN VOLTAGE OF SECOND SWITCH ELEMENT

MOTOR CONTROLLER

INCORPORATION BY REFERENCE

The disclosure of Japanese Patent Application No. 2018-027164 filed Feb. 19, 2018 including the specification, drawings and abstract, is incorporated herein by reference in its entirety.

BACKGROUND OF THE INVENTION

1. Field of the Invention

The present invention relates to a motor controller configured to perform pulse width modulation (PWM) drive on an electric motor.

2. Description of the Related Art

In a motor controller configured to perform vector control on a three-phase electric motor, two-phase current command values are calculated for each current control period. Two-phase voltage command values are calculated based on deviations between the two-phase current command values and detected two-phase current values. The two-phase voltage command values are subjected to two-phase/three-phase conversion by using a rotation angle of the electric motor. Thus, U-phase, V-phase, and W-phase voltage command values (three-phase voltage command values) are calculated. A U-phase PWM signal, a V-phase PWM signal, and a W-phase PWM signal having duties respectively corresponding to the U-phase, V-phase, and W-phase voltage command values are generated and supplied to a three-phase inverter circuit.

Six switching elements constituting the three-phase inverter circuit are controlled by the U-phase PWM signal, the V-phase PWM signal, and the W-phase PWM signal. Therefore, voltages corresponding to the three-phase voltage command values are applied to the three-phase electric motor. Thus, the three-phase electric motor is controlled so that the values of motor currents flowing through the three-phase electric motor are equal to the two-phase current command values (see Japanese Patent Application Publication No. 1-50766 (JP 1-50766 A) and Japanese Patent Application Publication No. 2016-100952 (JP 2016-100952 A)).

In the motor controller described above, at a rising timing and a falling timing of the output voltage of each phase (phase voltage) in each PWM period, a current flows via a stray capacitance that exists between the three-phase electric motor and a frame ground to which a negative terminal of a power supply is connected. This current flows into the frame ground. Therefore, there is a possibility that noise is emitted from the frame ground. In a case of a motor controller to be mounted on an electric power steering system (EPS) that is mounted on a vehicle, positive and negative power supply lines from a vehicle power supply (battery) to the EPS are long. Therefore, the noise current flowing through the frame ground is mixed into the positive and negative power supply lines in the vicinity of the vehicle power supply via the stray capacitance generated between the positive and negative power supply lines and the frame ground. This noise current corresponds to common mode noise.

SUMMARY OF THE INVENTION

It is one object of the present invention to provide a motor controller in which common mode noise can be reduced.

A motor controller according to one aspect of the present invention has the following features in its configuration. That is, the motor controller is configured to control an electric motor having a housing connected to a frame ground to which a negative terminal of a power supply is connected. The motor controller includes a drive circuit, a noise cancellation circuit, and a control unit. The drive circuit includes series circuits of upper-stage switching elements and lower-stage switching elements connected in parallel to the power supply and provided for a plurality of phases. The drive circuit is configured to supply electric power to the electric motor. The noise cancellation circuit includes an RLC circuit, a switch element, and a pull-down resistor. The RLC circuit is a series circuit of a resistor, a coil, and a capacitor. One end of the RLC circuit is electrically connected to a positive terminal of the power supply via the switch element, and the other end of the RLC circuit is electrically connected to the frame ground. A connection point between the RLC circuit and the switch element is electrically connected to the negative terminal of the power supply via the pull-down resistor. The control unit is configured to turn ON the switch element for a predetermined time at falling timings of phase voltages output from the drive circuit.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
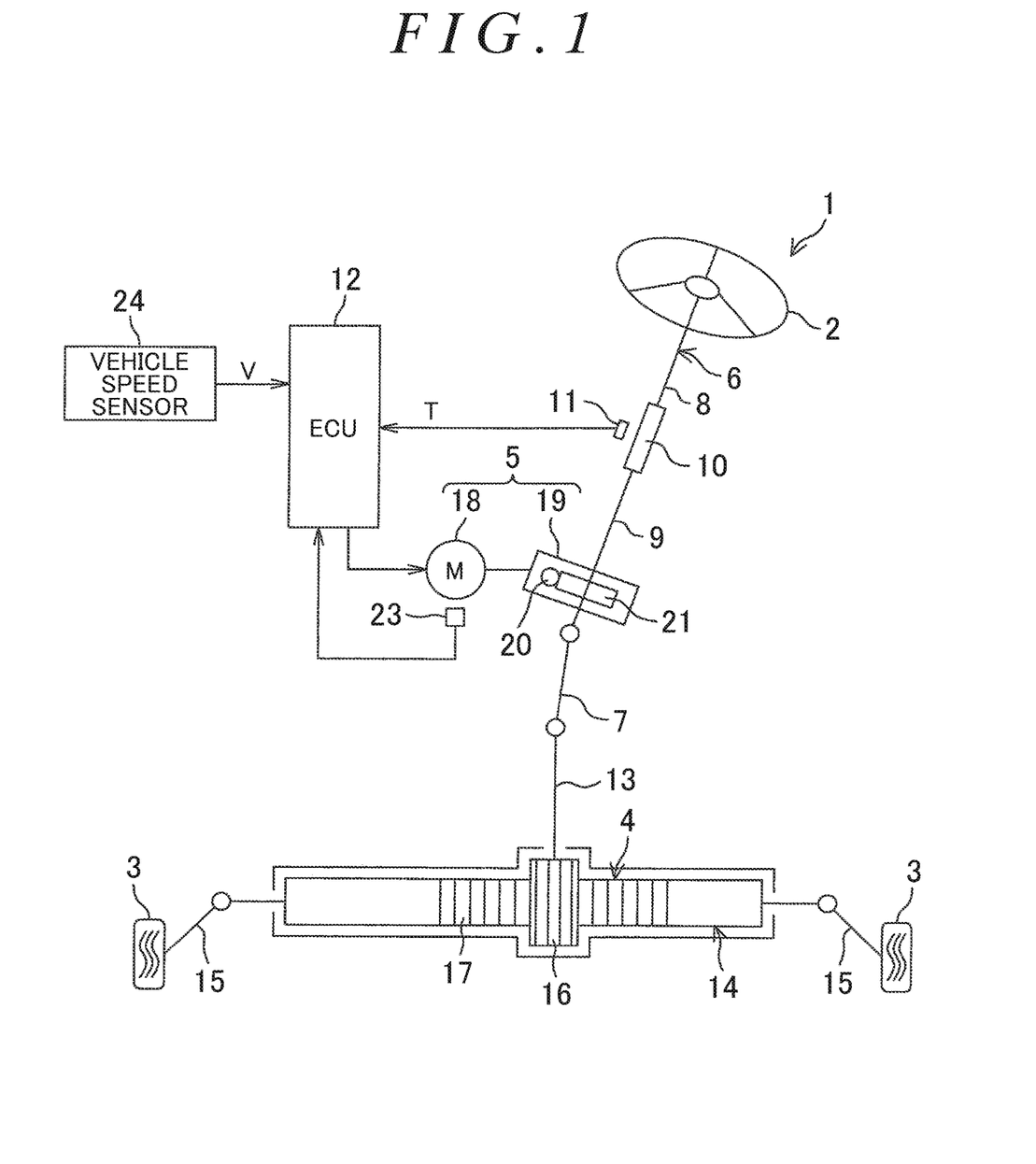
FIG. 1 is a schematic diagram illustrating an overall configuration of an electric power steering system to which a motor controller according to one embodiment of the present invention is applied.

An embodiment of the present invention that is applied to an electric power steering system is described below in detail with reference to the accompanying drawings. FIG. 1 is a schematic diagram illustrating an overall configuration of an electric power steering system to which a motor controller according to one embodiment of the present invention is applied. An electric power steering system (EPS) 1 includes a steering wheel 2, a steering operation mechanism 4, and a steering assist mechanism 5. The steering wheel 2 is a steering member for controlling steering of a vehicle. The steering operation mechanism 4 turns steered wheels 3 in association with rotation of the steering wheel 2. The steering assist mechanism 5 assists a driver's steering operation. The steering wheel 2 and the steering operation mechanism 4 are mechanically coupled to each other via a steering shaft 6 and an intermediate shaft 7.

The steering shaft 6 includes an input shaft 8 and an output shaft 9. The input shaft 8 is coupled to the steering wheel 2. The output shaft 9 is coupled to the intermediate shaft 7. The input shaft 8 and the output shaft 9 are coupled so as to be rotatable relative to each other via a torsion bar 10. A torque sensor 11 is arranged in the vicinity of the torsion bar 10. The torque sensor 11 detects a steering torque T applied to the steering wheel 2 based on a relative rotation displacement amount of the input shaft 8 and the output shaft 9. In this embodiment, for example, the steering torque T detected by the torque sensor 11 takes a positive value as a torque for steering to the right, and takes a negative value as a torque for steering to the left. As the absolute value of the steering torque T increases, the magnitude of the steering torque increases.

The steering operation mechanism 4 is constituted by a rack and pinion mechanism including a pinion shaft 13 and a rack shaft 14 serving as a steering operation shaft. The steered wheels 3 are coupled to the ends of the rack shaft 14 via tie rods 15 and knuckle arms (not illustrated), respectively. The pinion shaft 13 is coupled to the intermediate shaft 7. The pinion shaft 13 rotates in association with a steering operation of the steering wheel 2. A pinion 16 is coupled to the distal end of the pinion shaft 13 (lower end in FIG. 1).

The rack shaft 14 linearly extends along a lateral direction of an automobile. A rack 17 is formed at an axially middle part of the rack shaft 14. The rack 17 meshes with the pinion 16. The pinion 16 and the rack 17 convert rotation of the pinion shaft 13 to axial movement of the rack shaft 14. The steered wheels 3 can be turned through the axial movement of the rack shaft 14.

When the steering wheel 2 is steered (rotated), the rotation is transmitted to the pinion shaft 13 via the steering shaft 6 and the intermediate shaft 7. The pinion 16 and the rack 17 convert the rotation of the pinion shaft 13 to axial movement of the rack shaft 14. Thus, the steered wheels 3 are turned. The steering assist mechanism 5 includes an electric motor 18 and a speed reducing mechanism 19. The electric motor 18 is used for assisting a steering operation. The speed reducing mechanism 19 transmits an output torque of the electric motor 18 to the steering operation mechanism 4. In this embodiment, the electric motor 18 is a three-phase brushless motor. A rotation angle sensor 23 constituted by, for example, a resolver is arranged for the electric motor 18. The rotation angle sensor 23 detects a rotation angle of a rotor of the electric motor 18. The speed reducing mechanism 19 is constituted by a worm gear mechanism including a worm shaft 20 and a worm wheel 21 that meshes with the worm shaft 20.

The worm shaft 20 is driven to rotate by the electric motor 18. The worm wheel 21 is coupled to the steering shaft 6 so as to be rotatable together with the steering shaft 6. The worm wheel 21 is driven to rotate by the worm shaft 20. When the worm shaft 20 is driven to rotate by the electric motor 18, the worm wheel 21 is driven to rotate, and the steering shaft 6 therefore rotates. The rotation of the steering shaft 6 is transmitted to the pinion shaft 13 via the intermediate shaft 7. The rotation of the pinion shaft 13 is converted to axial movement of the rack shaft 14. Thus, the steered wheels 3 are turned. That is, the worm shaft 20 is driven to rotate by the electric motor 18. Accordingly, the steering operation can be assisted by the electric motor 18.

The vehicle is provided with a vehicle speed sensor 24 configured to detect a vehicle speed V. The steering torque T detected by the torque sensor 11, the vehicle speed V detected by the vehicle speed sensor 24, an output signal of the rotation angle sensor 23, and the like are input to an electronic control unit (ECU) 12. The ECU 12 controls the electric motor 18 based on the input signals.

Figure 2:
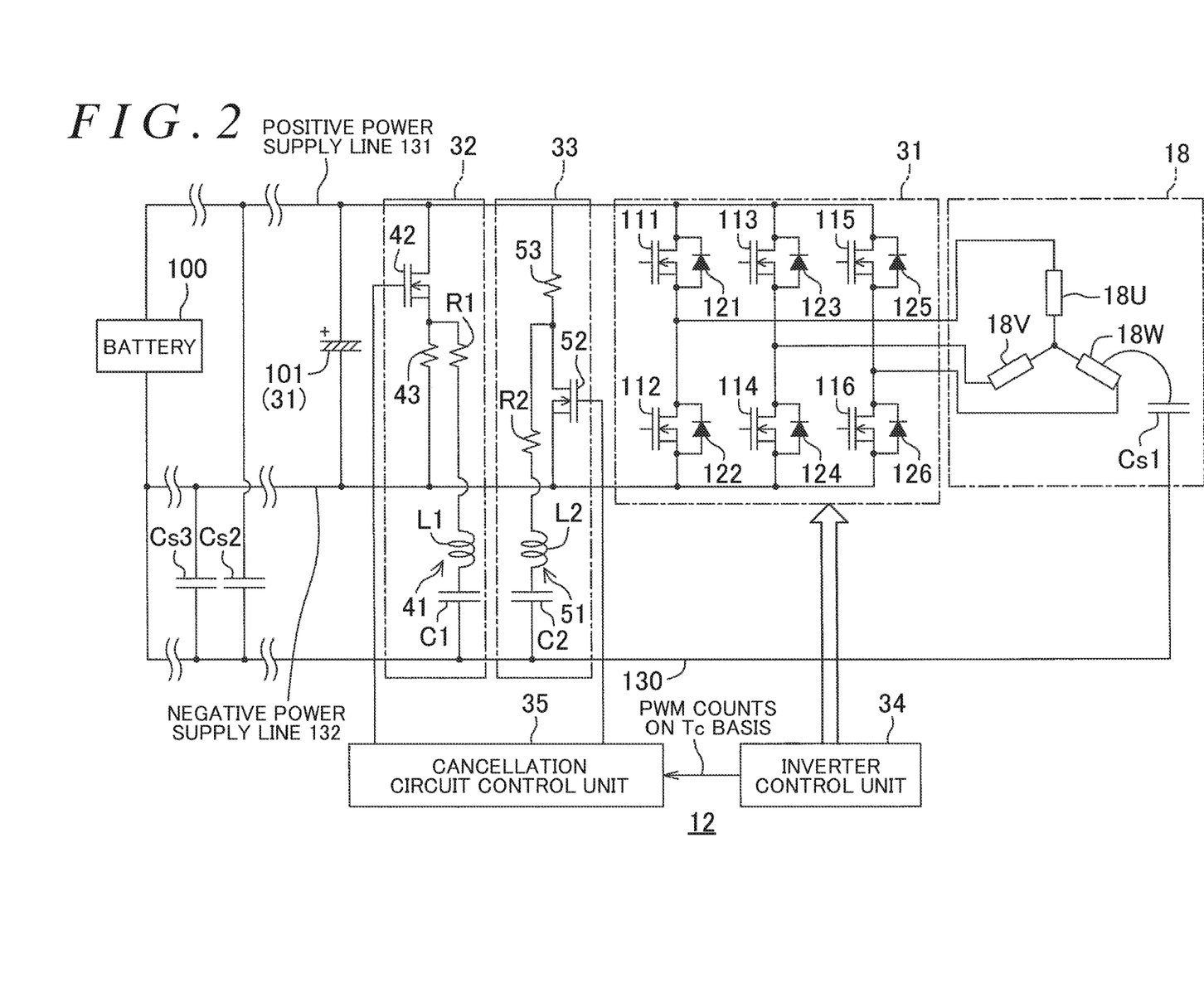
FIG. 2 is a block diagram illustrating the electrical configuration of an ECU.

FIG. 2 is a block diagram illustrating the overall electrical configuration of the ECU 12. The ECU 12 includes a motor drive circuit 31, a first noise cancellation circuit 32, a second noise cancellation circuit 33, an inverter control unit 34, and a cancellation circuit control unit 35. The motor drive circuit 31 is a circuit configured to supply electric power to the electric motor 18. The motor drive circuit 31 is controlled by the inverter control unit 34.

The first noise cancellation circuit 32 and the second noise cancellation circuit 33 are circuits configured to reduce common mode noise. The first noise cancellation circuit 32 and the second noise cancellation circuit 33 are controlled by the cancellation circuit control unit 35. For example, the electric motor 18 is a three-phase brushless motor. The electric motor 18 includes the rotor (not illustrated) serving as a field magnet, and a stator including U-phase, V-phase, and W-phase stator coils 18U, 18V, and 18W.

The motor drive circuit 31 is a three-phase inverter circuit. The motor drive circuit 31 includes a smoothing capacitor 101, a plurality of switching elements 111 to 116, and a plurality of diodes 121 to 126. The smoothing capacitor 101 is connected in series to a power supply (battery) 100. The smoothing capacitor 101 is connected between two terminals of the power supply 100. In this embodiment, the switching elements 111 to 116 are constituted by n-channel metal oxide semiconductor field effect transistors (MOSFETs). The switching elements 111 to 116 may hereinafter be referred to as FETs 111 to 116.

The FETs 111 to 116 include a U-phase upper-stage FET 111, a U-phase lower-stage FET 112 connected in series to the U-phase upper-stage FET 111, a V-phase upper-stage FET 113, a V-phase lower-stage FET 114 connected in series to the V-phase upper-stage FET 113, a W-phase upper-stage FET 115, and a W-phase lower-stage FET 116 connected in series to the W-phase upper-stage FET 115. The diodes 121 to 126 are connected inversely in parallel to the switching elements 111 to 116, respectively.

Drains of the upper-stage FETs 111, 113, and 115 are connected to a positive terminal of the smoothing capacitor 101. Sources of the upper-stage FETs 111, 113, and 115 are connected to drains of the lower-stage FETs 112, 114, and 116, respectively. Sources of the lower-stage FETs 112, 114, and 116 are connected to a negative terminal of the smoothing capacitor 101. A connection point between the U-phase upper-stage FET 111 and the U-phase lower-stage FET 112 is connected to the U-phase stator coil 18U of the electric motor 18. A connection point between the V-phase upper-stage FET 113 and the V-phase lower-stage FET 114 is connected to the V-phase stator coil 18V of the electric motor 18. A connection point between the W-phase upper-stage FET 115 and the W-phase lower-stage FET 116 is connected to the W-phase stator coil 18W of the electric motor 18. The FETs 111 to 116 are controlled based on PWM signals output from a PWM output unit 68 described later (see FIG. 3).

The power supply 100 is mounted on the vehicle. A negative (−) terminal of the power supply 100 is electrically connected to a metal frame (frame ground) 130 of the vehicle. Therefore, the frame 130 has the same potential as that of the negative terminal of the power supply 100. The electric power steering system 1 on which the electric motor 18 is mounted is attached to the frame 130 with bolts or the like. A positive power supply line and a negative power supply line of the ECU are connected to the positive and negative terminals of the power supply 100 through long lines, respectively. A housing of the electric motor 18 is electrically connected to the frame 130. A stray capacitance Cs1 exists between the housing and the stator coils 18U, 18V, and 18W of the electric motor 18. Thus, the stray capacitance Cs1 exists between the electric motor 18 and the frame 130. Stray capacitances Cs2 and Cs3 exist between the frame 130 and a positive power supply line 131 and a negative power supply line 132 that connect the power supply 100 and the electric power steering system 1 to each other.

The first noise cancellation circuit 32 includes a first RLC circuit 41, a first switch element 42, and a pull-down resistor 43. The first switch element 42 is constituted by an n-channel MOSFET. The first RLC circuit 41 is a series circuit of a first resistor R1, a first coil L1, and a first capacitor C1. The first resistor R1 is connected to one end of the first coil L1, and the first capacitor C1 is connected to the other end of the first coil L1.

One end of the first RLC circuit 41 (end on the first resistor R1 side) is electrically connected to the positive power supply line 131 via the first switch element 42. The other end of the first RLC circuit 41 (end on the first capacitor C1 side) is electrically connected to the frame 130. Specifically, a drain of the first switch element (MOSFET) 42 is electrically connected to the positive power supply line 131. A source of the first switch element 42 is electrically connected to the one end of the first RLC circuit 41. A connection point between the first RLC circuit 41 and the first switch element 42 (source of the first switch element 42) is electrically connected to the negative power supply line 132 via the pull-down resistor 43.

The second noise cancellation circuit 33 includes a second RLC circuit 51, a second switch element 52, and a pull-up resistor 53. The second switch element 52 is constituted by an n-channel MOSFET. The second RLC circuit 51 is a series circuit of a second resistor R2, a second coil L2, and a second capacitor C2. The second resistor R2 is connected to one end of the second coil L2, and the second capacitor C2 is connected to the other end of the second coil L2.

One end of the second RLC circuit 51 (end on the second resistor R2 side) is electrically connected to the negative power supply line 132 via the second switch element 52. The other end of the second RLC circuit 51 (end on the second capacitor C2 side) is electrically connected to the frame 130. Specifically, a drain of the second switch element (MOSFET) 52 is electrically connected to the one end of the second RLC circuit 51. A source of the second switch element 52 is electrically connected to the negative power supply line 132. A connection point between the second RLC circuit 51 and the second switch element 52 (drain of the second switch element 52) is electrically connected to the positive power supply line 131 via the pull-up resistor 53.

Figure 3:
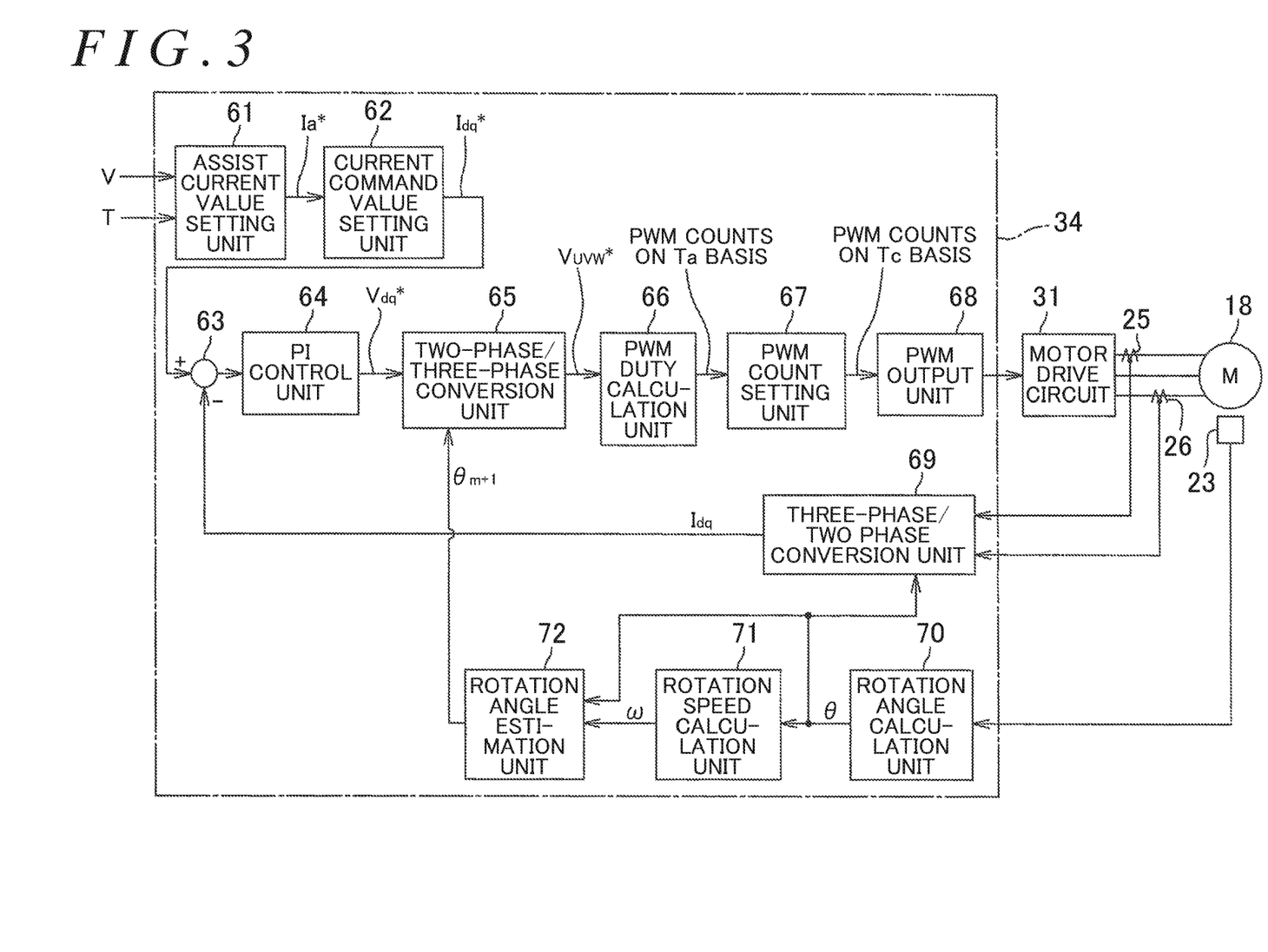
FIG. 3 is a block diagram mainly illustrating the configuration of an inverter control unit.

FIG. 3 is a block diagram mainly illustrating the configuration of the inverter control unit 34. In FIG. 3, the first noise cancellation circuit 32 and the second noise cancellation circuit 33 are omitted. Two current sensors 25 and 26 are provided on power supply lines for connecting the motor drive circuit 31 and the electric motor 18 to each other. The current sensors 25 and 26 are provided so as to detect phase currents flowing through two power supply lines out of the three power supply lines for connecting the motor drive circuit 31 and the electric motor 18 to each other.

The inverter control unit 34 is constituted by a microcomputer. The inverter control unit 34 includes an assist current value setting unit 61, a current command value setting unit 62, a current deviation calculation unit 63, a proportional-integral (PI) control unit 64, a two-phase/three-phase conversion unit 65, a PWM duty calculation unit 66, a PWM count setting unit 67, the PWM output unit 68, a three-phase/two-phase conversion unit 69, a rotation angle calculation unit 70, a rotation speed calculation unit 71, and a rotation angle estimation unit 72.

Figure 4A:
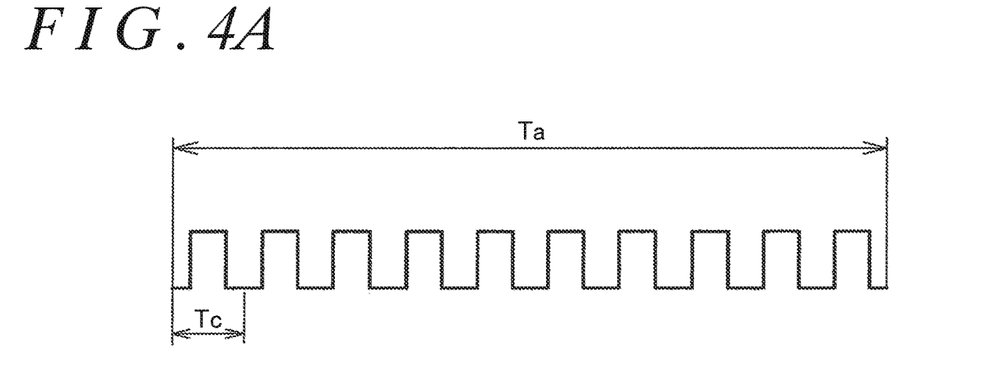
FIG. 4A is a schematic diagram illustrating a relationship between a period Tc of a PWM signal and a current control period Ta.

As illustrated in FIG. 4A, a period Tc of the PWM signal (hereinafter referred to as "PWM period Tc") is shorter than a current control period Ta. The current control period Ta is a calculation period of a control loop for motor currents. The current control period Ta is determined in consideration of, for example, the size of a program and the calculation capacity of the microcomputer constituting the inverter control unit 34. In this embodiment, the PWM duty calculation unit 66 updates PWM duties at a first timing in the current control period Ta of this time. Updated PWM duties Cu, Cv, and Cw are output. In this embodiment, Tc is one-tenth of Ta. In other words, 10 PWM periods Tc are included in the current control period Ta. The frequency of the PWM signal (=1/Tc) is referred to as a carrier frequency.

Figure 4B:
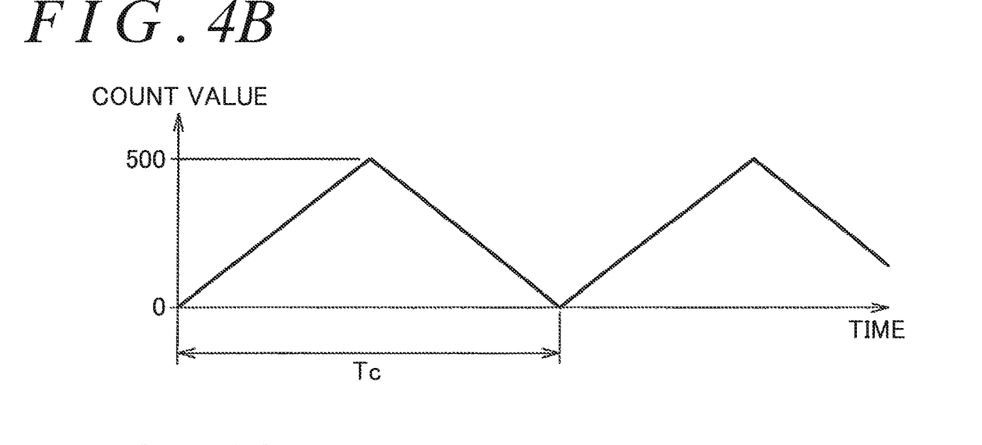
FIG. 4B is a waveform diagram illustrating a carrier waveform.

Description is given of a method for generating a PWM waveform in this embodiment. In the inverter control unit 34, a counter (not illustrated) counts up and down a clock that has a PWM clock frequency and is generated by a clock generator (not illustrated). FIG. 4B illustrates a count value of the counter in a plot in which the horizontal axis represents time and the vertical axis represents the count value. It is understood that the count value is an unsigned integer. The count value may be referred to as a carrier count. In this embodiment, the waveform of FIG. 4B is a carrier waveform. The carrier waveform is a triangular wave. One period of the triangular wave is equal to Tc. The frequency of the PWM signal (carrier frequency) is determined based on a maximum value of the carrier waveform, that is, a maximum value of the count value. In this embodiment, the PWM clock frequency is 100 [MHz]. The frequency of the PWM signal (hereinafter referred to as "PWM frequency") is set to 100 [kHz]. Therefore, the maximum value of the count value is 100,000,000÷100,000÷2=500. Because of the up-count and the down-count, "100,000,000/100,000" is divided by 2.

Figure 4C:
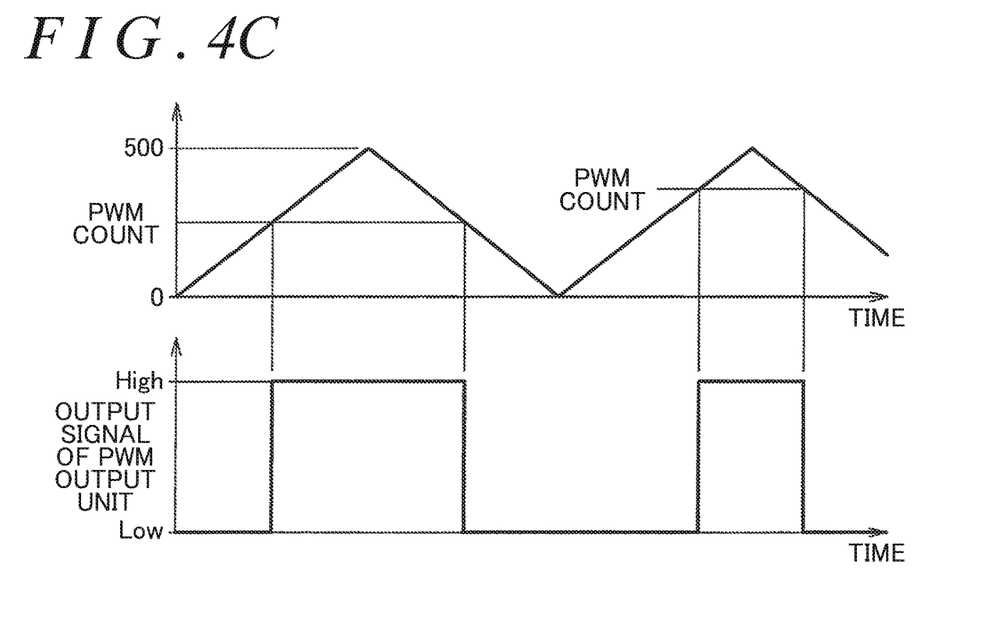
FIG. 4C is a schematic diagram for describing a method for generating the PWM signal.

As illustrated in FIG. 4C, the PWM output unit 68 compares a given PWM count with the count value of the counter to output a High signal or a Low signal to the motor drive circuit 31. For example, the PWM output unit 68 outputs the High signal (or the Low signal) while "count value of counter≥PWM count" holds, or otherwise outputs the Low signal (or the High signal). The High signal and the Low signal serve as the PWM signals.

In general, there are the following two patterns as a change pattern of ON/OFF states of the upper-stage FET and the lower-stage FET in the PWM period Tc (ON/OFF pattern).

First ON/OFF pattern: change pattern of upper-stage FET: ON→lower-stage FET: ON→upper-stage FET: ON from start of carrier count Second ON/OFF pattern: change pattern of lower-stage FET: ON→upper-stage FET: ON→lower-stage FET: ON from start of carrier count In this embodiment, the U-phase, V-phase, and W-phase upper-stage and lower-stage FETs are controlled in the second ON/OFF pattern. Referring back to FIG. 3, the rotation angle calculation unit 70 calculates a rotation angle (electrical angle) θ of the rotor of the electric motor 18 for each current control period Ta based on an output signal of the rotation angle sensor 23. The rotor rotation angle θ calculated by the rotation angle calculation unit 70 is supplied to the three-phase/two-phase conversion unit 69, the rotation speed calculation unit 71, and the rotation angle estimation unit 72. In this embodiment, the timing when the rotor rotation angle θ is acquired (detected) is a timing in the middle of the current control period Ta.

The rotation speed calculation unit 71 calculates a rotation speed (angular velocity) ω of the rotor of the electric motor 18 by determining a time derivative of the rotor rotation angle θ calculated by the rotation angle calculation unit 70. The rotation speed w calculated by the rotation speed calculation unit 71 is supplied to the rotation angle estimation unit 72. The rotation angle estimation unit 72 estimates a rotor rotation angle $\theta_{(m+1)}$ in the middle of a subsequent current control period Ta based on Expression (1) by using a rotor rotation angle $\theta_{(m-1)}$ in the middle of a previous current control period Ta, which is acquired in the previous current control period Ta.

$$\theta_{(m+1)} = \theta_{(m-1)} + \omega \cdot 2Ta \quad (1)$$

Figure 5:
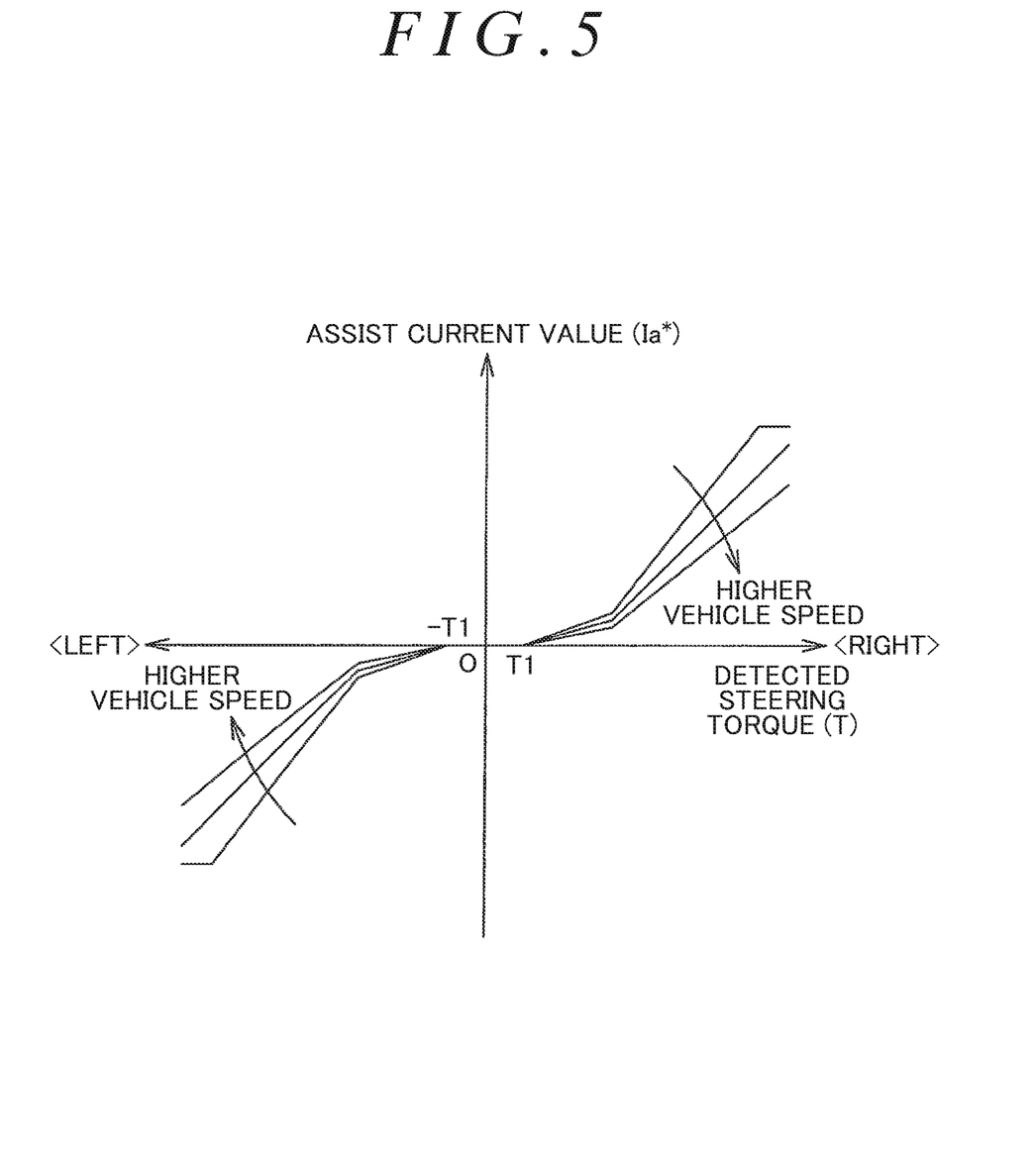
FIG. 5 is a graph illustrating an example of setting of an assist current value Ia* relative to a detected steering torque T.

The rotor rotation angle $\theta_{(m+1)}$ in the subsequent current control period Ta, which is estimated by the rotation angle estimation unit 72, is supplied to the two-phase/three-phase conversion unit 65. The assist current value setting unit 61 sets an assist current value Ia* for each current control period Ta based on the steering torque T detected by the torque sensor 11 and the vehicle speed V detected by the vehicle speed sensor 24. FIG. 5 illustrates an example of setting of the assist current value Ia* relative to the detected steering torque T. For example, the detected steering torque T takes a positive value as a torque for steering to the right, and takes a negative value as a torque for steering to the left. The assist current value Ia* takes a positive value when the electric motor 18 generates a steering assist force for steering to the right, and takes a negative value when the electric motor 18 generates a steering assist force for steering to the left. The assist current value Ia* is positive when the detected steering torque T takes a positive value, and is negative when the detected steering torque T takes a negative value.

When the detected steering torque T takes an infinitesimal value that falls within a range (torque dead band) from −T1 to T1 (for example, T1=0.4 N·m), the assist current value Ia* is set to zero. When the detected steering torque T takes a value that falls out of the range from −T1 to T1, the assist current value Ia* is set so that its absolute value increases as the absolute value of the detected steering torque T increases. The assist current value Ia* is set so that its absolute value decreases as the vehicle speed V detected by the vehicle speed sensor 24 increases. Thus, the steering assist force is greater when the vehicle travels at a lower speed, and is weaker when the vehicle travels at a higher speed.

The current command value setting unit 62 sets values of currents to be caused to flow in coordinate axes of a dq coordinate system as current command values based on the assist current value Ia* set by the assist current value setting unit 61. Specifically, the current command value setting unit 62 sets a d-axis current command value $I_d^*$ and a q-axis current command value $I_q^*$ (hereinafter may be referred to collectively as "two-phase current command values $I_{dq}^*$"). More specifically, the current command value setting unit 62 sets the q-axis current command value $I_q^*$ to the assist current value Ia* set by the assist current value setting unit 61, and sets the d-axis current command value $I_d^*$ to zero. The two-phase current command values $I_{dq}^*$ set by the current command value setting unit 62 are supplied to the current deviation calculation unit 63.

The three-phase/two-phase conversion unit 69 first calculates a U-phase current $I_U$, a V-phase current $I_V$, and a W-phase current $I_W$ (hereinafter may be referred to collectively as "detected three-phase currents $I_{UVW}$") based on two-phase currents detected by the current sensors 25 and 26. The three-phase/two-phase conversion unit 69 performs coordinate conversion from the detected three-phase currents $I_{UVW}$ in a UVW coordinate system to detected two-phase currents $I_{dq}$ in the dq coordinate system. The detected two-phase currents $I_{dq}$ are constituted by a detected d-axis current $I_d$ and a detected q-axis current $I_q$. The rotor rotation angle θ calculated by the rotation angle calculation unit 70 is used for the coordinate conversion.

The current deviation calculation unit 63 calculates a deviation of the detected d-axis current $I_d$ from the d-axis current command value $I_d^*$ and a deviation of the detected q-axis current $I_q$ from the q-axis current command value $I_q^*$. The deviations are supplied to the PI control unit 64. The PI control unit 64 performs PI calculation on the current deviations calculated by the current deviation calculation unit 63. Thus, the PI control unit 64 generates two-phase voltage command values $V_{dq}^*$ (d-axis voltage command value $V_d^*$ and q-axis voltage command value $V_q^*$) for voltages to be applied to the electric motor 18. The two-phase voltage command values $V_{dq}^*$ are supplied to the two-phase/three-phase conversion unit 65.

The two-phase/three-phase conversion unit 65 performs two-phase/three-phase conversion on the two-phase voltage command values $V_{dq}^*$ calculated by the PI control unit 64 in a current control period Ta of this time by using the estimated rotation angle value $\theta_{(m+1)}$ for the subsequent current control period Ta, which is calculated by the rotation angle estimation unit 72 in the current control period Ta of this time. Thus, the two-phase/three-phase conversion unit 65 calculates three-phase voltage command values $V_{UVW}^*$ for the subsequent current control period Ta. The three-phase voltage command values $V_{UVW}^*$ are constituted by a U-phase voltage command value $V_U^*$, a V-phase voltage command value $V_V^*$, and a W-phase voltage command value $V_W^*$. Accordingly, the three-phase voltage command values $V_{UVW}^*$ for the subsequent current control period Ta are obtained.

The three-phase voltage command values $V_{UVW}^*$ for the subsequent current control period Ta, which are obtained by the two-phase/three-phase conversion unit 65, are supplied to the PWM duty calculation unit 66. The PWM duty calculation unit 66 generates a U-phase PWM count (PWM duty), a V-phase PWM count, and a W-phase PWM count for the subsequent current control period Ta based on the three-phase voltage command values $V_{UVW}^*$ for the subsequent current control period Ta. The U-phase PWM count, the V-phase PWM count, and the W-phase PWM count are supplied to the PWM count setting unit 67.

In this embodiment, the upper-stage and lower-stage FETs of the respective phases are controlled in the second ON/OFF pattern. Thus, the U-phase PWM count is obtained as follows, for example. That is, the PWM duty calculation unit 66 calculates a U-phase PWM count Cu for a certain current control period Ta based on Expression (2) by using a U-phase voltage command value $V_U^*$ for the current control period Ta, which is obtained by the two-phase/three-phase conversion unit 65, and a maximum PWM count Cmax.

$$Cu = \text{maximum value of PWM count} - \{V_U^* \times (\text{maximum value of PWM count}/Vb)\} = \text{maximum value of PWM count} - \{V_U^* \times (500/Vb)\} \quad (2)$$

In Expression (2), Vb represents a power supply voltage of the motor drive circuit 31 (output voltage of the power supply 100). A V-phase PWM count Cv can be calculated when a V-phase voltage command value $V_V^*$ is used in place of the U-phase voltage command value $V_U^*$ on the right-hand side of Expression (2). A W-phase PWM count Cw can be calculated when a W-phase voltage command value $V_W^*$ is used in place of the U-phase voltage command value $V_U^*$ on the right-hand side of Expression (2).

The PWM count setting unit 67 sets the U-phase, V-phase, and W-phase PWM counts Cu, Cv, and Cw for the subsequent current control period Ta, which are supplied from the PWM duty calculation unit 66, as U-phase, V-phase, and W-phase PWM counts Cu, Cv, and Cw for the respective PWM periods Tc within the subsequent current control period Ta. The U-phase PWM counts, the V-phase PWM counts, and the W-phase PWM counts for the respective PWM periods Tc within the subsequent current control period Ta, which are set by the PWM count setting unit 67, are supplied to the PWM output unit 68 and to the cancellation circuit control unit 35 (see FIG. 2).

The PWM output unit 68 stores, over a plurality of current control periods, U-phase PWM counts, V-phase PWM counts, and W-phase PWM counts for the respective PWM periods Tc within the current control periods Ta, which are supplied from the PWM count setting unit 67. Based on U-phase PWM counts, V-phase PWM counts, and W-phase PWM counts for the respective PWM periods Tc within the current control period Ta of this time, which are supplied from the PWM count setting unit 67 in the previous current control period Ta, the PWM output unit 68 generates U-phase PWM signals, V-phase PWM signals, and W-phase PWM signals for the respective PWM periods Tc within the current control period Ta of this time, and supplies the U-phase PWM signals, the V-phase PWM signals, and the W-phase PWM signals to the motor drive circuit 31. Specifically, in the respective PWM periods Tc within the current control period Ta of this time, the PWM output unit 68 generates U-phase PWM signals, V-phase PWM signals, and W-phase PWM signals having duties respectively corresponding to the U-phase PWM counts, the V-phase PWM counts, and the W-phase PWM counts for the respective PWM periods Tc within the current control period Ta, and supplies the U-phase PWM signals, the V-phase PWM signals, and the W-phase PWM signals to the motor drive circuit 31.

The six FETs 111 to 116 constituting the motor drive circuit 31 are controlled by the PWM signals supplied from the PWM output unit 68. Thus, voltages corresponding to the three-phase voltage command values $V_{UVW}^*$ for the respective PWM periods Tc are applied to the stator coils 18U, 18V, and 18W of the respective phases of the electric motor 18. The current deviation calculation unit 63 and the PI control unit 64 constitute a current feedback controller. Through an operation of the current feedback controller, the electric motor 18 is controlled so that the values of motor currents flowing through the electric motor 18 are close to the two-phase current command values $I_{dq}^*$ set by the current command value setting unit 62.

Referring back to FIG. 2, the cancellation circuit control unit 35 is described. The cancellation circuit control unit 35 is constituted by a microcomputer. The inverter control unit 34 and the cancellation circuit control unit 35 may be constituted by a single microcomputer. The cancellation circuit control unit 35 stores, over a plurality of current control periods, U-phase PWM counts, V-phase PWM counts, and W-phase PWM counts for the respective PWM periods Tc within the current control periods Ta, which are supplied from the PWM count setting unit 67.

Based on U-phase PWM counts, V-phase PWM counts, and W-phase PWM counts for the respective PWM periods Tc within the current control period Ta of this time, which are supplied from the PWM count setting unit 67 in the previous current control period Ta, the cancellation circuit control unit 35 detects rising timings of respective phase voltages (U-phase voltage, V-phase voltage, and W-phase voltage) and falling timings of the respective phase voltages. In the respective PWM periods Tc within the current control period Ta of this time, the cancellation circuit control unit 35 turns ON the second switch element 52 of the second noise cancellation circuit 33 for a predetermined time at the rising timings of the respective phase voltages output from the motor drive circuit 31. In the respective PWM periods Tc within the current control period Ta of this time, the cancellation circuit control unit 35 turns ON the first switch element 42 of the first noise cancellation circuit 32 for a predetermined time at the falling timings of the respective phase voltages output from the motor drive circuit 31.

Figure 6:
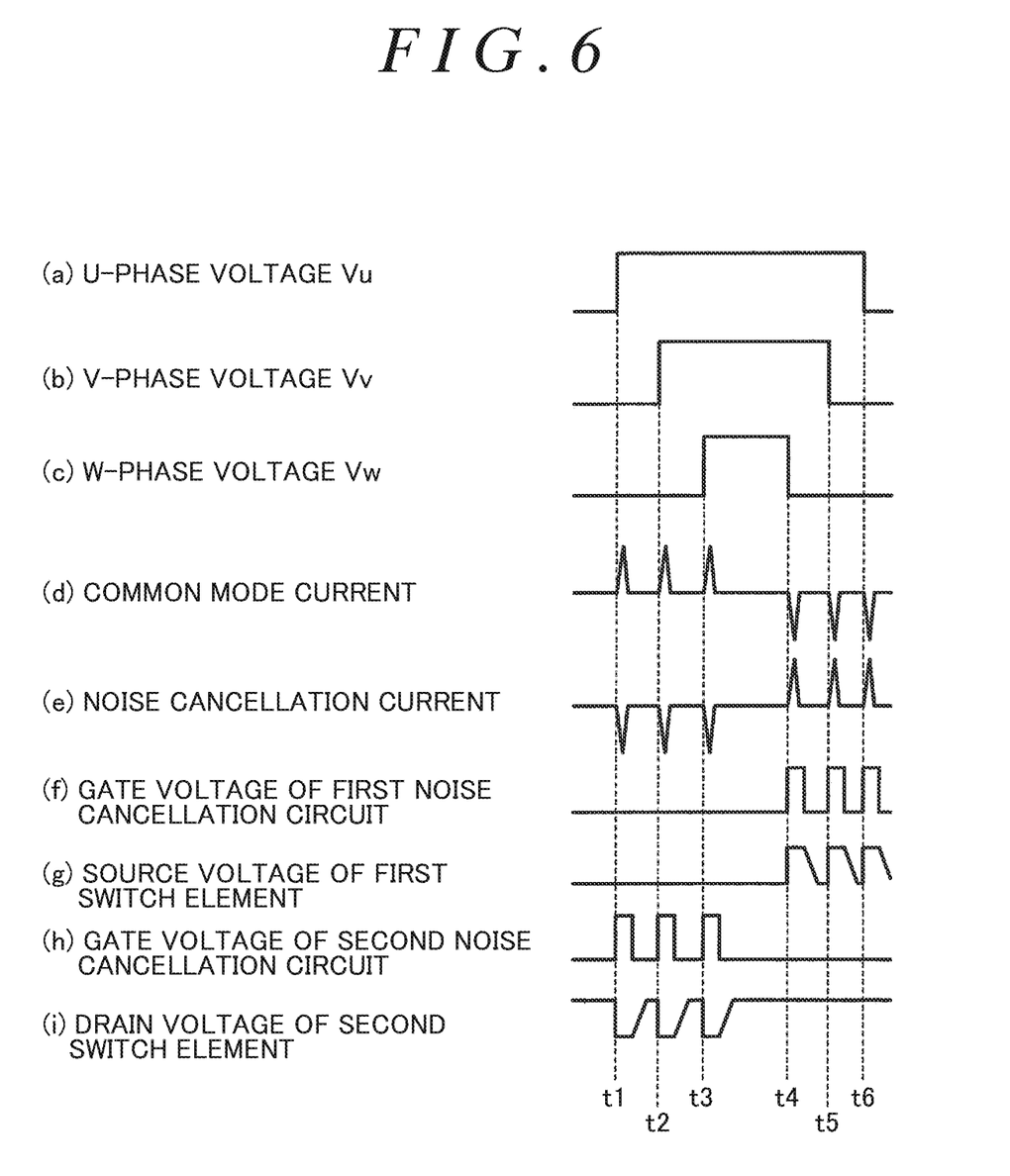
FIG. 6 is a time chart illustrating signals of respective parts in the PWM period Tc.

FIG. 6 is a time chart illustrating signals of respective parts in the PWM period Tc. In the following description, a direction in which a current flows into the frame 130 is a positive direction, and a direction in which a current flows out of the frame 130 is a negative direction. In the example of FIG. 6, a U-phase voltage Vu rises at a time t1, and falls at a time t6 (see Part (a) of FIG. 6). A V-phase voltage Vv rises at a time t2, and falls at a time t5 (see Part (b) of FIG. 6). A W-phase voltage Vw rises at a time t3, and falls at a time t4 (see Part (c) of FIG. 6).

Thus, at the rising timings t1, t2, and t3 of the respective phase voltages, a common mode current (current in the positive direction) illustrated in Part (d) of FIG. 6 flows via the stray capacitance Cs1 (see FIG. 2) that exists between the electric motor 18 and the frame 130. The cancellation circuit control unit 35 turns ON the second switch element 52 of the second noise cancellation circuit 33 for a predetermined time at the rising timings t1, t2, and t3 of the respective phase voltages. That is, as illustrated in Part (h) of FIG. 6, a gate voltage is applied to a gate of the second switch element 52 for a predetermined time at the rising timings t1, t2, and t3 of the respective phase voltages. Thus, a drain voltage of the second switch element 52 changes as illustrated in Part (i) of FIG. 6. That is, the drain voltage of the second switch element 52 falls at the rising timings t1, t2, and t3 of the respective phase voltages, and gently rises after an elapse of a predetermined time. The drain voltage of the second switch element 52 gently rises when the second switch element 52 is turned OFF because the second capacitor C2 is charged via the pull-up resistor 53 when the second switch element 52 is turned OFF.

Thus, the current that flows in the positive direction into the frame 130 from the electric motor 18 via the stray capacitance Cs1 at the times t1, t2, and t3 turns into a current that flows in the negative direction from the frame 130 via the second RLC circuit 51, and further flows into the electric motor 18 via the second switch element 52. Accordingly, it is possible to reduce a common mode current that flows via the stray capacitances Cs2 and Cs3 between the power supply lines 131 and 132 and the frame 130. When the second switch element 52 is turned OFF, the drain voltage of the second switch element 52 gently rises. Thus, it is possible to reduce the occurrence of noise when the second switch element 52 is turned OFF.

In other words, at the rising timings t1, t2, and t3 of the respective phase voltages, the second noise cancellation circuit 33 generates a noise cancellation current (see Part (e) of FIG. 6) having a phase opposite to that of the common mode current that flows into the positive and negative power supply lines 131 and 132 from the frame 130. Thus, the common mode noise is reduced. At the falling timings t4, t5, and t6 of the respective phases, a common mode current (current in the negative direction) illustrated in Part (d) of FIG. 6 flows via the stray capacitance Cs1 (see FIG. 2) that exists between the electric motor 18 and the frame 130.

The cancellation circuit control unit 35 turns ON the first switch element 42 of the first noise cancellation circuit 32 for a predetermined time at the falling timings t4, t5, and t6 of the respective phase voltages. That is, as illustrated in Part (f) of FIG. 6, a gate voltage is applied to a gate of the first switch element 42 for a predetermined time at the falling timings t4, t5, and t6 of the respective phase voltages. Thus, a source voltage of the first switch element 42 changes as illustrated in Part (g) of FIG. 6. That is, the source voltage of the first switch element 42 rises at the falling timings t4, t5, and t6 of the respective phase voltages, and gently falls after an elapse of a predetermined time. The source voltage of the first switch element 42 gently falls when the first switch element 42 is turned OFF because charge in the first capacitor C1 is released via the pull-down resistor 43 when the first switch element 42 is turned OFF.

Thus, the current that flows in the negative direction into the electric motor 18 from the frame 130 via the stray capacitance Cs1 at the times t4, t5, and t6 turns into a current that flows in the positive direction into the frame 130 via the motor drive circuit 31, the first switch element 42, and the first RLC circuit 41. Accordingly, it is possible to reduce a common mode current that flows via the stray capacitances Cs2 and Cs3 between the power supply lines 131 and 132 and the frame 130. When the first switch element 42 is turned OFF, the source voltage of the first switch element 42 gently falls. Thus, it is possible to reduce the occurrence of noise when the first switch element 42 is turned OFF.

In other words, at the falling timings t4, t5, and t6 of the respective phase voltages, the first noise cancellation circuit 32 generates a noise cancellation current (see Part (e) of FIG. 6) having a phase opposite to that of the common mode current that flows into the positive and negative power supply lines 131 and 132 from the frame 130. Thus, the common mode noise is reduced. When the rising timings or the falling timings of two or more phase voltages out of the U-phase voltage, the V-phase voltage, and the W-phase voltage overlap each other in the respective PWM periods within the current control period, it is preferable that the PWM counts be adjusted so that the timings do not overlap each other. For example, when the U-phase PWM count and the V-phase PWM count are equal to each other in the current control period, the rising timings and the falling timings of the phase voltages overlap each other. In this case, it is appropriate to perform, for example, adjustment so that the U-phase PWM count is different from the V-phase PWM count in the respective PWM periods within the current control period without changing the total value of the U-phase PWM counts in the PWM periods within the current control period.

In the embodiment described above, description is given of the case where the present invention is applied to the motor controller for the electric power steering system. The present invention is also applicable to a motor controller to be used for other purposes than the electric power steering system. In addition, various design modifications may be made within the scope of the matter described in the claims.

What is claimed is:

1. A motor controller configured to control an electric motor having a housing connected to a frame ground to which a negative terminal of a power supply is connected, the motor controller comprising:
   a drive circuit including series circuits of upper-stage switching elements and lower-stage switching elements connected in parallel to the power supply and provided for a plurality of phases, the drive circuit being configured to supply electric power to the electric motor;
   a noise cancellation circuit; and
   a control unit, wherein
   the noise cancellation circuit includes an RLC circuit, a switch element, and a pull-down resistor, the RLC circuit being a series circuit of a resistor, a coil, and a capacitor,
   one end of the RLC circuit is electrically connected to a positive terminal of the power supply via the switch element, and the other end of the RLC circuit is electrically connected to the frame ground,
   a connection point between the RLC circuit and the switch element is electrically connected to the negative terminal of the power supply via the pull-down resistor, and
   the control unit is configured to turn ON the switch element for a predetermined time at falling timings of phase voltages output from the drive circuit.

2. A motor controller configured to control an electric motor having a housing connected to a frame ground to which a negative terminal of a power supply is connected, the motor controller comprising:
   a drive circuit including series circuits of upper-stage switching elements and lower-stage switching elements connected in parallel to the power supply and provided for a plurality of phases, the drive circuit being configured to supply electric power to the electric motor;
   a noise cancellation circuit; and
   a control unit, wherein
   the noise cancellation circuit includes an RLC circuit, a switch element, and a pull-up resistor, the RLC circuit being a series circuit of a resistor, a coil, and a capacitor,
   one end of the RLC circuit is electrically connected to the negative terminal of the power supply via the switch element, and the other end of the RLC circuit is connected to the frame ground,
   a connection point between the RLC circuit and the switch element is electrically connected to a positive terminal of the power supply via the pull-up resistor, and
   the control unit is configured to turn ON the switch element for a predetermined time at rising timings of phase voltages output from the drive circuit.

3. A motor controller configured to control an electric motor having a housing connected to a frame ground to which a negative terminal of a power supply is connected, the motor controller comprising:
   a drive circuit including series circuits of upper-stage switching elements and lower-stage switching elements connected in parallel to the power supply and provided for a plurality of phases, the drive circuit being configured to supply electric power to the electric motor;

a first noise cancellation circuit;

a second noise cancellation circuit; and a control unit, wherein the first noise cancellation circuit includes a first RLC circuit, a first switch element, and a pull-down resistor, the first RLC circuit being a series circuit of a first resistor, a first coil, and a first capacitor, one end of the first RLC circuit is electrically connected to a positive terminal of the power supply via the first switch element, and the other end of the first RLC circuit is electrically connected to the frame ground, a connection point between the first RLC circuit and the first switch element is electrically connected to the negative terminal of the power supply via the pull-down resistor, the second noise cancellation circuit includes a second RLC circuit, a second switch element, and a pull-up resistor, the second RLC circuit being a series circuit of a second resistor, a second coil, and a second capacitor, one end of the second RLC circuit is electrically connected to the negative terminal of the power supply via the second switch element, and the other end of the second RLC circuit is connected to the frame ground, a connection point between the second RLC circuit and the second switch element is electrically connected to the positive terminal of the power supply via the pull-up resistor, and the control unit includes:
  a unit configured to turn ON the first switch element for a predetermined time at falling timings of phase voltages output from the drive circuit; and
  a unit configured to turn ON the second switch element for a predetermined time at rising timings of the phase voltages output from the drive circuit.

* * * * *